(12) United States Patent  
Raghavan et al.

(10) Patent No.: US 9,375,021 B2  
(45) Date of Patent: Jun. 28, 2016

(54) COMBINATION OVEN WITH REDUCED SMOKE FLAVOR TRANSFER

(71) Applicant: Alto-Shaam, Inc., Menomonee Falls, WI (US)

(72) Inventors: J.K. Raghavan, Mequon, WI (US); Janus Bartelick, Germantown, WI (US); Joshua Paul Wittig, New Berlin, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 105 days.

(21) Appl. No.: 13/952,756

(22) Filed: Jul. 29, 2013

(65) Prior Publication Data

US 2015/0030728 A1 Jan. 29, 2015

(51) Int. Cl.
*A23B 4/052* (2006.01)
*A47J 27/04* (2006.01)

(52) U.S. Cl.
CPC ............... *A23B 4/0523* (2013.01); *A47J 27/04* (2013.01); *A47J 2027/043* (2013.01)

(58) Field of Classification Search
CPC .......... A23B 4/044; A23B 4/056; A23L 1/31
USPC ............ 426/231; 99/474; 219/393, 400, 401, 219/411; 126/20, 21 A
See application file for complete search history.

(56) References Cited

U.S. PATENT DOCUMENTS

| | | | |
|---|---|---|---|
| 5,193,491 A * | 3/1993 | Oslin et al. | 122/401 |
| 6,188,045 B1 | 2/2001 | Hansen et al. | |
| 7,157,668 B2 | 1/2007 | Bartelick | |
| 7,317,173 B2 | 1/2008 | Bartelick et al. | |
| 7,755,005 B2 | 7/2010 | Bartelick et al. | |

\* cited by examiner

*Primary Examiner* — Steven Leff
(74) *Attorney, Agent, or Firm* — Boyle Fredrickson, S.C.

(57) ABSTRACT

A combination oven for cooking with heat and steam provides a boiler system for creating steam and includes a smoker appliance for generating smoke flavor during the cooking process. An oven controller detecting the use of the smoke appliance institutes a flushing and filling of the boiler after such use to reduce the transfer of smoke flavors to food that is subsequently cooked in the oven.

10 Claims, 3 Drawing Sheets

COMBINATION OVEN WITH REDUCED SMOKE FLAVOR TRANSFER

BACKGROUND OF THE INVENTION

The present invention relates to ovens, and in particular to ovens, such as combination ovens, that may provide cooking with steam derived from a boiler unit.

Combination ovens provide the ability to cook food using a combination of techniques, typically including both convection and steam. As is understood in the art, convection cooking may employ a fan near the oven heater that circulates heated air throughout the cooking cavity. Steam cooking introduces steam into the cooking cavity, for example, by employing a jet of water to spray water on a convection fan and/or heater (in a "boiler-less" design) such as is described in U.S. Pat. No. 6,188,045 assigned to the assignee of the present invention and hereby incorporated by reference.

An alternative technique for steam cooking employs a boiler providing a boiler chamber separated from the cooking cavity through a port that may communicate steam from the boiler chamber into the cooking cavity. The boiler holds a volume of water and a separate heater that heats the volume of water to the boiling point under the control of the oven control system. Boiler designs are described, for example, in U.S. Pat. No. 7,755,005 assigned to the assignee of the present invention and also hereby incorporated by reference.

Combination ovens are versatile and normally used to prepare a range of different foods. in order to prevent flavor transfer between earlier and later foods cooked in the combination oven, the oven may provide for a cleaning cycle in which the interior is cleaned with water, steam, and/or other cleaning materials in between different cooking sessions. A built in spray hose may be provided for the purpose of keeping the oven interior clean and/or an internal set of spray nozzles may be activated by the user as part of a cleaning cycle.

in order to further increase the versatility of such combination ovens, a smoker accessory may be provided. for example, comprising a tray that may hold woodchips and heat them with a contained electrical resistance heater. Combination ovens providing smoking capability are described in U.S. Pat. Nos. 7,317,173 and 7,157,668 both assigned to the assignee of the present invention and incorporated by reference.

A cleaning cycle is typically employed in between cooking cycles of the combination oven including cooking cycles employing a smoking process to reduce the transfer of flavors to subsequently cooked foods.

SUMMARY OF THE INVENTION

The present inventors have determined that significant smoke flavor may be absorbed within the water of a boiler used in a combination oven, making conventional cleaning of ,he oven interior insufficient to ensure extremely low transfer of smoke flavors between foods. This absorption appears to be the result of absorption into the water of the boiler which is then released in a subsequent steam cycle. Accordingly, the present invention provides an automatic boiler flush cycle before a subsequent cooking cycle when it has been determined that the smoking accessory has previously been used.

Specifically, one embodiment the present invention provides a combination oven including an insulated housing including a door closing over a cooking cavity and a cooking cavity heater communicating with the cooking cavity to heat the cooking cavity. A boiler chamber defines a volume for holding water and provides a port communicating between the volume and the cooking cavity and holds a boiler heater positioned to heat water in the volume of the boiler chamber. The boiler chamber communicates with an electronically actuable water valve communicating between a water source and the boiler chamber to provide water thereto and an electronically actuable drain valve communicating between the boiler chamber and a drain. The oven further includes a smoker appliance electronically controllable to introduce a vaporizable smoke material into the cooking cavity. An electronic computer communicates with the water valve, drain valve, and smoker appliance and executes a program stored in memory to activate the smoker appliance during a cooking cycle, and further, based on activation of the smoker appliance, to activate the water valve and drain valve after the cooking cycle to flush and refill the boiler chamber.

It is thus a feature of at least one embodiment of the invention to prevent the transfer of smoke flavor to subsequent foods prepared in a combination oven having a boiler. Whereas it might be expected that very little smoke would pass into the boiler unit because of its small port that is typically discharging steam, the present inventors have determined that the capacity of the boiler water to absorbed smoke particularly when the boiler is not used and to later release that smoke flavor when the steamer is used, provides a path of transferring smoke between cooked foods. A forced flushing of this water breaks this path.

The electronic computer may further activate the water valve and drain valve to flush and refill the boiler chamber based on an event other than activation of the smoker appliance such as elapsed time since the last flushing and refilling of the boiler chamber or a number of cooking cycles since the last flushing and refilling of the boiler chamber.

It is thus a feature of at least one embodiment of the invention to provide a flush cycle for the removal of smoke flavor in distinction from a flush cycle used to prevent the buildup of lime on the boiler walls.

The flushing and refilling of the boiler chamber may first substantially fully drain the boiler chamber and then refill the boiler chamber.

It is thus a feature of at least one embodiment of the invention to provide for a flushing process distinct from normal water makeup during the boiler operation in which complete water exchange is provided.

The smoker appliance may be a container having a resistance element for heating the contents of the container with electrical current wherein the electrical current is controlled by the electronic computer.

It is thus a feature of at least one embodiment of the invention to provide a smoker appliance whose operation may automatically be detected by the oven controller for the purpose of automatic boiler flushing The cooking cavity may be sealed against airflow into and out of the cavity except through a pressure relief vent.

It is thus a feature of at least one embodiment of the invention to provide decreased flavor transfer in closed system ovens.

The cooking cavity may further include an internal sprayer receiving a source of water for spraying inside of the cooking cavity for cleaning the cooking cavity.

It is thus a feature of at least one embodiment of the invention to provide a flavor transfer prevention mechanism extending beyond normal cleaning of the cooking cavity.

The boiler chamber may include baffle plates providing a serpentine path for water vapor out of the boiler chamber.

It is thus a feature of at least one embodiment of the invention to maintain a water charge in the boiler even when the boiler is not used to prevent flavor accumulation on the high surface area interior of the boiler chamber, shielding that surface with the water charge which may be then drained according to the present invention.

The boiler chamber provides a single port communicating with the cooking cavity.

It is thus a feature of at least one embodiment of the invention to address unexpected flavor accumulation within the closed boiler chamber.

These particular objects and advantages may apply to only some embodiments falling within the claims and thus do not define the scope of the invention.

DETAILED DESCRIPTION OF THE PREFERRED EMBODIMENT

Figure 1:
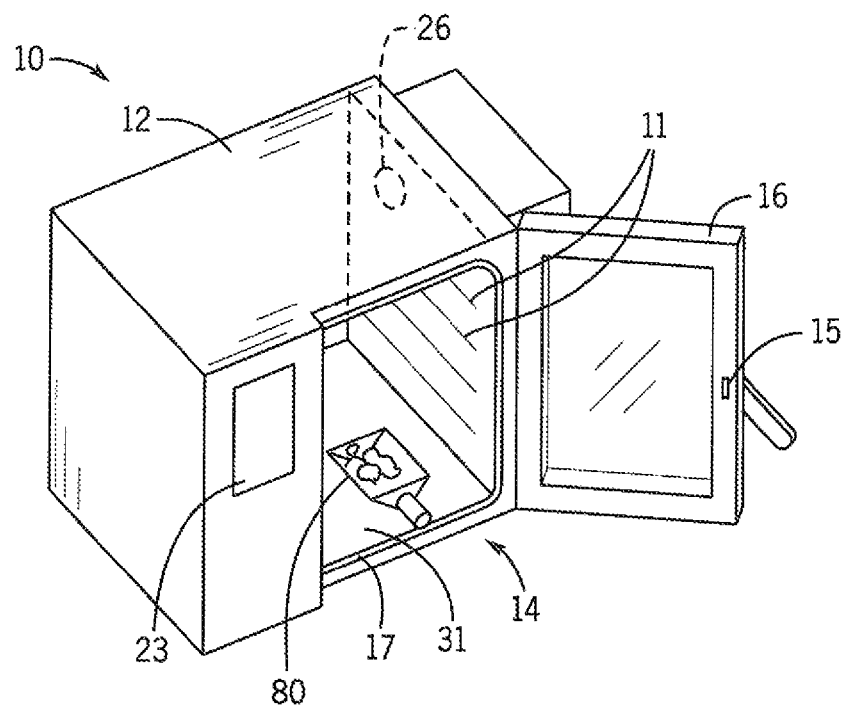
FIG. 1 is a perspective view of a combination oven showing the cooking cavity and a smoker tray prior to installation on a smoker heating element at a back wall of the cooking cavity and showing a port from the cooking cavity to a boiler chamber.

Referring now to FIG. 1, combination oven 10, according to one embodiment of the present invention, may provide a housing 12 defining a cooking cavity 14 within the housing 12. Sidewalls of the cooking cavity 14 may provide for rack supports 11 holding conventional cooking racks for supporting pans or trays of food.

The cooking cavity 14 may be accessed through a door 16 connected by a hinge at one vertical side of the cooking cavity 14. The door 16 may close over the cooking cavity 14 during the cooking operation as held by a latch assembly 15 (visible on the door 16 only). In the closed position, the door 16 may substantially seal against the cooking cavity 14 by compressing a gasket 17 surrounding an opening of the cooking cavity 14 in the housing 12.

At one side of the cooking cavity 14, the housing 12 may expose a control panel 23 accessible by a user standing at a front of the oven 10. The control panel 23 may present conventional electronic controls such as switches, buttons, a touchscreen or the like that may receive oven control data from the user as will be described below.

Figure 2:
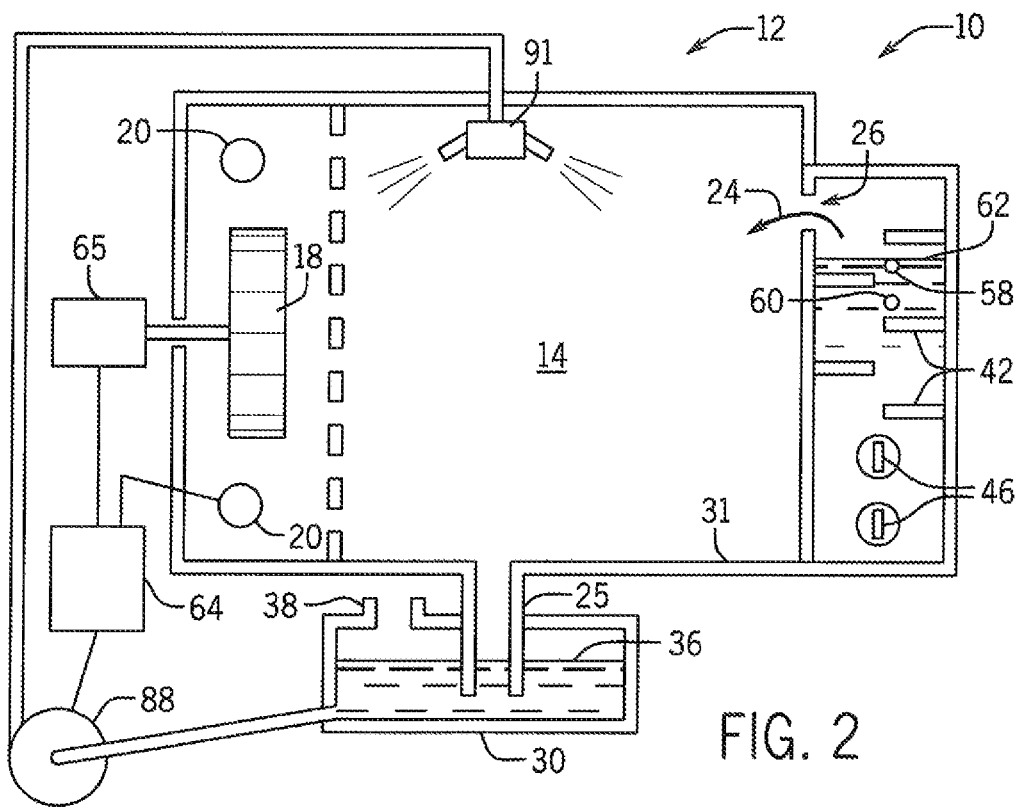
FIG. 2 is a simplified diagram of a cleaning system for the cooking cavity such as may operate in tandem with a boiler flushing cycle of the present invention.

Referring now also to FIG. 2, a motor-driven convection fan 18 is typically positioned within the housing 12 in communication with the cooking cavity 14 to direct a stream of air across a heater element 20 into the cooking cavity 14. The heater element 20 may surround the convection fan 18 and may be an electric resistance element or a heat exchanger tube receiving heat from a gas flame or the like.

A bottom wall 31 of the cooking cavity 14 may provide a drainpipe 25 extending downwardly from the bottom wall 31 to a water trap 30 positioned beneath the bottom wall 31. The drainpipe 25 may extend vertically (as shown) or may extend horizontally for a short distance before or after it is received within the water trap 30.

In either case, the drainpipe 25 allows steam and water vapor to enter the water trap 30 from the otherwise sealed cooking cavity 14, the water trap 30 providing a generally enclosed box whose upstanding sidewalls retain a pool of water having a water level 36. The lower end of the drainpipe 28 passes downward through the water level 36 stopping above its bottom wall 33. An exit port 38 to the side of the drainpipe 28 provides a passageway out of the water trap 30 from a point above the water level 36. Generally, therefore, the water trap 30 seals the cooking cavity 14 from the free flow of air into or out of the cooking cavity 14 unless a pressure difference exists sufficient to displace the water within the drainpipe 25 so as to allow gases to bubble through water to pass between the drainpipe 24 and exit port 38. In this respect, the water trap 30 provides an excess pressure relief valve.

A boiler 22, as will be described below, may be located to the side of the cooking cavity 14, typically opposite the convection fan 18. Generally the boiler 22 provides steam 24 into the cooking cavity 14 through a steam port 26 positioned near the top of the boiler 22.

Ovens of this type are commercially available from Alto-Shaam Inc. of Menomonee Falls, Wisc. and are described generally in U.S. Pat. No. 6,188,045 "Combination Oven with Three Stage Water Atomizer", and the above-referenced patent is hereby incorporated by reference.

Figure 3:
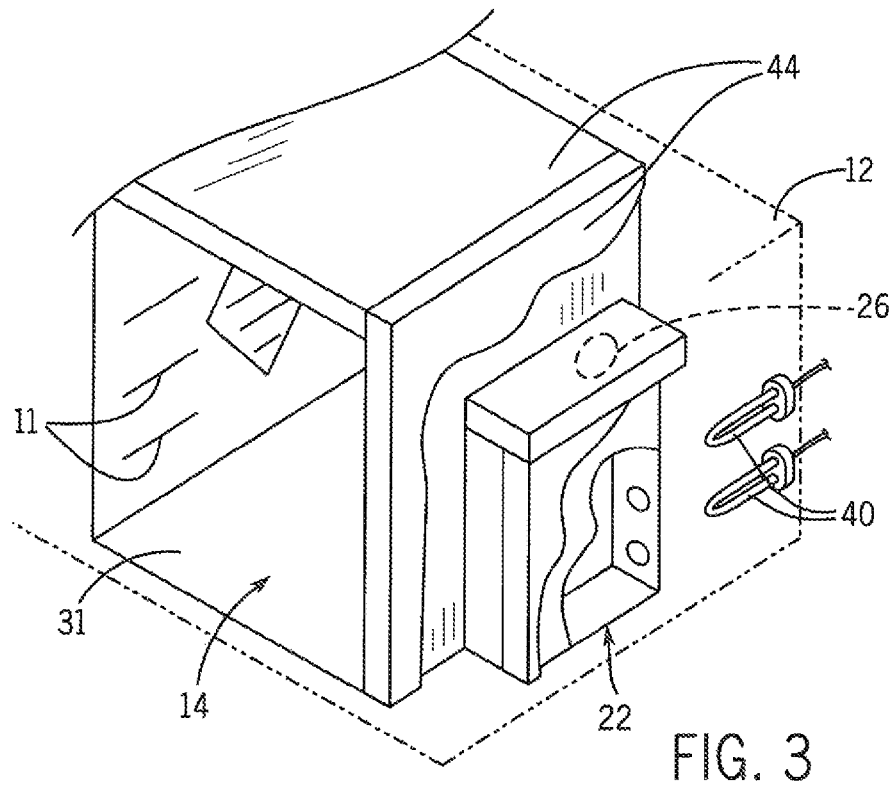
FIG. 3 is a perspective view of the boiler chamber attached to the side of the cooking cavity.

Referring now to FIGS. 2 and 3, a lower portion of the boiler 22 may admit electrical heaters 40 to heat the water within the boiler 22 to boiling point to generate steam. Inwardly extending baffles 42 on the opposed inner walls of the boiler 22 are positioned to prevent steam bubbles generated at the heaters 40 from carrying water out of the port 26 while nevertheless allowing steam 24 to pass upward and out of that port 26. The outer surfaces of the boiler 22 and the cooking cavity 14 are covered with an insulating material 44 such as fiberglass to minimize heat loss from these elements out of the housing 12.

Figure 4:
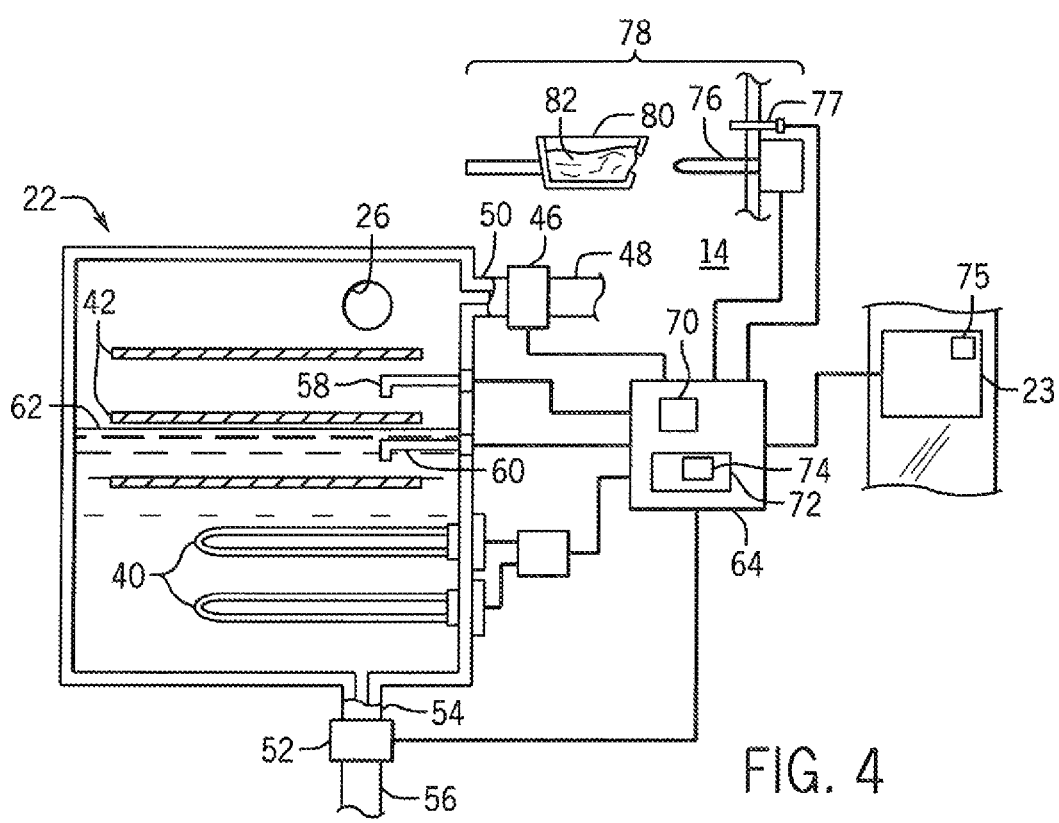
FIG. 4 is a block diagram of the principal components of the boiler chamber of FIG. 2 as controlled by an electronic oven controller.

Referring now to FIG. 4, an electric water valve 46 may communicate with a source of water 48, for example, filters attached to a water main or the like, so that the electric water valve 46 may control water flow into the boiler 22 through an entrance pipe 50 positioned near the top of the boiler chamber 22. The entrance pipe 50 may be positioned so as to not discharge water through the port 26 (when the first electric water valve 46 is open) but nevertheless to permit water to spray down the inside of the boiler 22 above the normal level of water within the boiler 22. A second electric water valve 52 may communicate with an exit pipe 54 positioned at the bottom of the boiler 22 to conduct water (when the second electric water valve 52 is open) from the boiler 22 to a drainpipe 56 that may lead to a building water drain or the like.

An upper and lower water sensor 58 and 60 may extend through one wall of the boiler 22 into the volume of the boiler 22 to detect the presence of water at first and second vertically displaced locations about a desired water level and hence to allow determination of a water height 62 within the boiler chamber to above, below, or between the first and second water sensors 58 and 60.

Referring momentarily also to FIG. 2, each of valve 46 and 52, heaters 40, and water sensors 58 and 60 may be in electrical communication with a controller 64 that also provides electrical connections to other controllable elements of the oven 10, for example, including a motor 65 driving the fan 18, the heater elements 20 and the motor 65. The controller 64 may provide for an electronic computer 70 and an electronic memory 72 holding within it a stored program 74 whose operation will be described below allowing it to control these various electrical components.

The controller 64 may provide electrical communication with a heating element 76 being part of a smoker appliance 78 including a tray 80 fitting over the heating element holding woodchips 82 or the like therein. Operation of the heating element 76 under control of the controller 64 heats the woodchips 82 until they begin to smoke to impart a smoky flavor to the food in the cooking cavity 14. In addition, the controller 64 may receive electrical signals from one or more temperature sensors 77 positioned in the cooking cavity 14.

During operation of the oven 10, the controller 64 receives data input from a user through the control panel 23. Such data may include, for example, an input 75 indicating a desire to use a smoking process during a cooking cycle. Other inputs may include cooking temperatures, the use of steam, the use of convection, the identification of recipes associated with particular combinations of cooking conditions and cooking schedules. According to methods well understood in the art, the controller 64 then provides electrical signals to equipment of the oven 10 during a cooking cycle according to these user inputs and the oven sensors. As is generally understood in the art, a cooking cycle normally consists of one session of heating the cooking cavity 14 up to a cooking temperature for cooking food and ultimately cooling the cooking cavity 14 after cooking for removal of the food therefrom.

Figure 5:
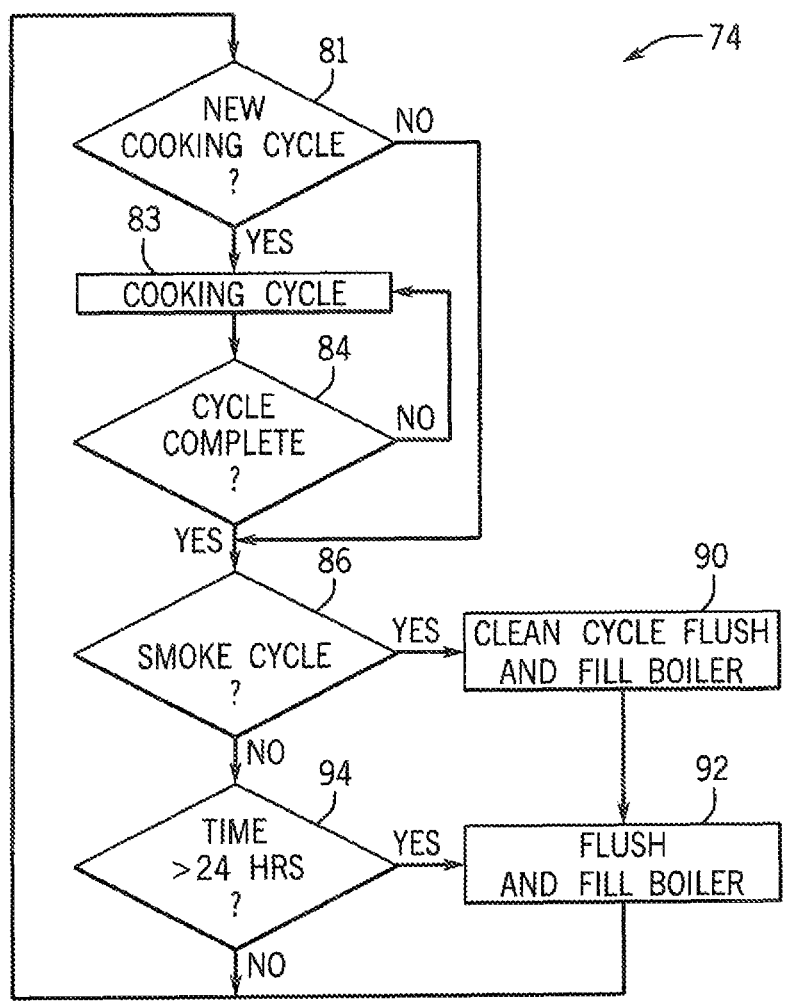
FIG. 5 is a flowchart of a program executed by the controller FIG. 3 for implementation of an additional boiler flush cycle after a cooking cycle that uses smoke.

Referring now to FIG. 5, in this control process, the program 74 executed by the controller 64 may generally check for user input at decision block 81 indicating a desire to operate the oven 10 to cook a particular food and the conditions for the oven operation. As noted, this input may provide direct control of the oven (for example setting a temperature, the use of steam, the use of the convection fan 18, and/or the use of the smoker appliance 78 or the like) or maybe a selection of a pre-programmed cycle selecting among these different features or a recipe which denotes a particular set of operating conditions.

At process block 83, the particular cooking cycle may be implemented, for example, through feedback control of the heater elements 20 (shown in FIG. 2) based on readings of the temperature sensors 77. During this cooking cycle, steam and/or convection fan operation may be employed and cooking timers implemented in the program to control the timing of these operations during the cooking cycle.

When steam is desired as part of the cooking cycle of process block 83, the heaters 40 may be activated and the water level monitored by means of sensors 58 and 60 to activate water valve 46 to make up water into the boiler 22 when sensor 60 indicates that the water level has dropped below the height of sensor 60. The water continues to be added until sensing occurs at higher water sensor 58. Steam 24 is expelled from the boiler 22 by the inherent expansion of water when it passes from the liquid to the gaseous state.

At the conclusion of the cooking cycle, as determined by this decision block 84, the program may proceed to decision block 86 to determine whether there has been smoke usage during the cooking cycle. This may be readily determined by a flag set by the controller 64 when the heating element 76 is activated during a cooking cycle. If smoke has been employed, then at process block 98, a cleaning cycle may be implemented followed by a filling and flushing of the boiler 22.

Referring momentarily to FIG. 2, in one embodiment, the cleaning cycle may instruct the user to place cleaning materials into the water trap 30 which serves as a reservoir for cleaning liquid. Liquid in the water trap 30 is then recycled by a pump 88 to a sprayer head 91 positioned at the top of the cooking cavity 14 which sprays the cleaning solution about the cooking cavity 14 for a predetermined period of time as determined by the controller 64.

Referring to FIG. 4 during the flush and fill cycle, valve 52 is fully opened for a period of time sufficient to hilly drain the boiler 22 and then the valve 52 is closed and valve 46 is opened until the boiler cavity is again filled as indicated by a sensing of sensor 58 and 60.

This process of draining and then refilling the boiler cavity is then repeated as indicated by process block 92.

If at decision block 86 a smoke cycle was not employed (or if the processes of process blocks 90 and 92 have been completed after the smoke cycle) at decision block 94, the program determines whether a regular flushing of the boiler 22 should be performed such as is intended to prevent lime build up on the internal surfaces of the boiler 22 caused by inherent concentration of impurities with boiling away of water. This determination normally looks at length of time since the last flushing or a number of cooking cycles since the last flushing. If that limit has been exceeded, program 74 proceeds at process block 92 for single flushing and filling. Otherwise the program proceeds back to loop at decision block 81.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. ft is also to be understood that additional or alternative steps may be employed.

References to "a controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims, All of the publications described herein, including patents and non-patent publications, are hereby incorporated herein by reference in their entireties.

What we claim is:

1. A combination oven comprising:
   an insulated housing including a door closing to define an interior cooking cavity and opening to provide access to the cooking cavity;
   a cooking cavity having a first heater communicating with the cooking cavity to heat the cooking cavity;
   a boiler chamber defining a volume for holding water and providing a port communicating between the volume and the cooking cavity;
   a boiler heater positioned to heat water in the volume of the boiler chamber;
   an electronically actuable pump to provide a cleaning solution into the cooking cavity during a cleaning cycle;
   an electronically actuable water valve communicating between a water source and the boiler chamber to provide water thereto;
   an electronically actuable drain valve communicating between the boiler chamber and a drain;
   a smoker appliance having a second heater electronically controllable to introduce a vaporizable smoke material into the cooking cavity only upon activating the second heater wherein the second heater is a resistance element for heating contents of the smoker appliance with electrical current; and
   an electronic computer communicating with the water valve, drain valve, and smoker appliance and executing a program stored in memory to:
      activate the smoker appliance during a cooking cycle by activating the second heater and setting a flag, and
      check the flag to determine whether the smoker appliance has been activated during a given cooking cycle to control the water valve and drain valve so that when a cleaning cycle is activated after the a given cooking cycle and before a next cooking cycle immediately following the given cooking cycle and when the flag indicates that the smoker appliance was activated in the given cooking cycle, activate the water valve and drain valve to flush and refill the boiler chamber.

2. The combination oven of claim 1 wherein the electronic computer further activates the water valve and drain valve to flush and refill the boiler chamber based on an event other than activation of the smoker appliance, the event selected from the group consisting of elapsed time since a last flushing and refilling of the boiler chamber and a number of cooking cycles since the last flushing and refilling of the boiler chamber.

3. The combination oven of claim 1 wherein the flushing and refilling of the boiler chamber first substantially fully drains the boiler chamber and then refills the boiler chamber.

4. The combination oven of claim 3 wherein the boiler chamber includes a first and second water height detector and wherein the electronic computer further operates to maintain a water volume between the first and second level heights during operation of the boiler and wherein the draining of the boiler volume is based on a time duration of the opening of the drain valve, and the filling of the boiler chamber is based on one of the first and second water height detectors.

5. The combination oven of claim 1 wherein the cooking cavity is substantially sealed against airflow into and out of the cooking cavity except through a pressure relief vent.

6. The combination oven of claim 5 wherein the pressure relief vent is a water trap requiring a predetermined pressure for the flow of air therethrough.

7. The combination oven of claim 1 wherein the cooking cavity further includes an internal sprayer receiving a source of water for spraying the inside of the cooking cavity for cleaning the cooking cavity.

8. The combination oven of claim 1 wherein the boiler chamber includes baffle plates providing a serpentine path for water vapor out of the boiler chamber.

9. The combination oven of claim 1 wherein the boiler chamber provides a single port communicating with the cooking cavity.

10. A method for operating a combination oven of a type having:
   an insulated housing including a door closing to define an interior cooking cavity and opening to provide access to the cooking cavity;
   a cooking cavity having a first heater communicating with the cooking cavity to heat the cooking cavity;
   a boiler chamber defining a volume for holding water and providing a port communicating between the volume and the cooking cavity;
   a boiler heater positioned to heat water in the volume of the boiler chamber;
   an electronically actuable pump to provide a cleaning solution into the cooking cavity during a cleaning cycle;
   an electronically actuable water valve communicating between a water source and the boiler chamber to provide water thereto;
   an electronically actuable drain valve communicating between the boiler chamber and a drain;
   a smoker appliance having a second heater electronically controllable to introduce a vaporizable smoke material into the cooking cavity only activating the second heater wherein the second heater is a resistance element for heating contents of the smoker appliance with electrical current; and
   an electronic computer communicating with the water valve, drain valve, and smoker appliance, the method comprising the steps of executing a stored program on the electronic computer to:
      (a) activate the smoker appliance during a cooking cycle by activating the second heater and setting flag; and
      (b) check the flag to determine whether the smoker appliance has been activated during a given cooking cycle to control the water valve and drain valve so that when a cleaning cycle is activated after the given cooking cycle and before a next cooking cycle immediately following the given cooking cycle and when the flag indicates that the smoker appliance was activated, in the given cooking cycle, activate the water valve and drain valve to flush and refill the boiler chamber.

* * * * *